Sept. 27, 1966  J. B. MEISTER ET AL  3,274,790

TEMPERATURE SENSING CONTROL MEANS FOR ICE MAKING DEVICES

Filed June 9, 1965

INVENTORS
JACK B. MEISTER
RAYMOND J. STATEN
BY
N. Friedman
ATTORNEY

United States Patent Office 3,274,790
Patented Sept. 27, 1966

3,274,790
TEMPERATURE SENSING CONTROL MEANS FOR ICE MAKING DEVICES
Jack B. Meister, Morristown, and Raymond J. Staten, Budd Lake, N.J., assignors to Integrated Electronics Corporation, Wharton, N.J., a corporation of New Jersey
Filed June 9, 1965, Ser. No. 462,560
11 Claims. (Cl. 62—135)

The present invention pertains to temperature sensing control means.

More particularly, it relates to controlling the operation of automatic ice cube makers such as are employed in refrigerators. These customarily comprise a unit which automatically fills the ice tray with water, and then ejects the ice into a bin when it is completely frozen, whereupon the cycle is repeated.

In such automatic ice makers, the temperature of the ice being formed is sensed to determine when the freezing is completed. It is important that the temperature sensing be quite accurate. If the ice is ejected before it is solidly frozen, the cubes crack when they are ejected into the bin, and the water from their unfrozen centers causes all the ice in the bin to freeze into one solid, unusable large mass.

Conversely, for the most rapid rate of ice cube production, the ice cubes should be ejected as soon as they have reached their completely frozen temperature.

One typical previous approach used is to sense the temperature by a thermistor, which is arranged to control a magnetic reed relay. This has various disadvantages. The relay is D.C.-operated, requiring conversion from A.C. The relay is sensitive to line voltage fluctuation, necessitating expensive voltage-regulating circuitry. A compensating network is required to keep the relay resistance constant despite substantial fluctuations in ambient temperature. Stray magnetic fields affect the operation of the relay. Also, as the relay approaches its pull-in state, it is very sensitive to vibration since even a very small reduction in the flux gap will then be enough to cause unintended contact closure.

It is the object of the present invention to provide a thermostatic control device, primarily for use in ice cube makers, which avoids the above disadvantages, but is nonetheless more reliable and less expensive to fabricate than prior devices.

An object of the present invention is an inexpensive, accurate, and reliable temperature sensing control device.

Another object is such a device which can operate on either A.C. or D.C.

Another object is such a device which automatically compensates for fluctuations in line voltage.

Another object is such a device which automatically compensates for changes in ambient temperature.

The above, and other objects, advantages, and features of the invention will be apparent to those skilled in the art from the following detailed description of the invention when read in conjunction with the accompanying drawing, in which.

Figure 1:
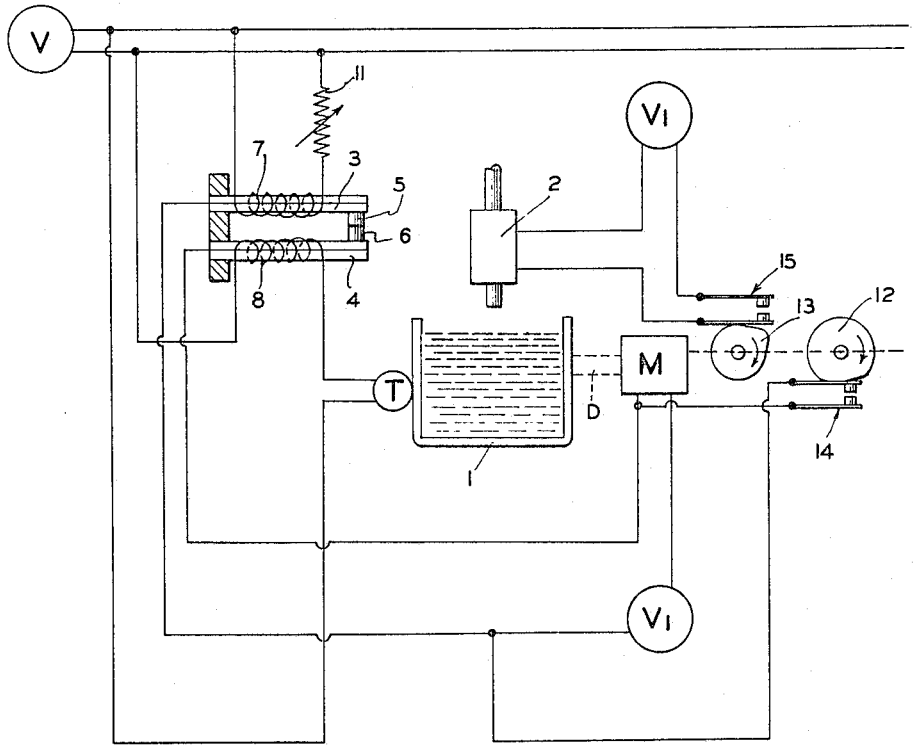
FIG. 1 is a diagrammatic view of the system of the invention.

In the preferred form of the invention now to be described, there are two identical bimetallic members which bend as their temperature changes, each provided with an identical electric resistance heating coil. A thermistor arranged to sense the temperature of the ice in the ice cube tray is in series with one of the heating coils. A presettable variable resistor is in series with the other heating coil. As the temperature of the ice being formed is dropping, the changing resistance of the thermistor will be controllling the current in its associated coil to cause its related bimetallic strip to bend toward the other strip. When the ice has reached its completely frozen temperature, contacts carried by the bimetallic strips will touch, initiating an ice-ejecting cycle.

In the drawing, the reference numeral 1 designates an ice cube tray, in which ice is to be formed in a refrigerator. Water is introduced into tray 1 under control of a conventional solenoid-operated valve 2. When the water has completely frozen, as determined by a temperature sensing thermistor T mounted in intimate contact with tray 1, the circuitry of the invention is effective to initiate operation of a motor M. It has been found that in general when the temperature of the ice in tray 1 has dropped to 10° F., it will be completely frozen.

In any suitable manner, the details of which are not relevant to the present invention, motor M will cause the ice cubes to be released and ejected from the tray. One usual way of doing this is to provide a suitable drive train D between motor M and the tray 1 which will cause twisting of the tray (the latter being of flexible material) to free the ice cubes, and which will also turn the tray upside down to discharge the cubes into a bin from which they can be removed as desired.

The novel temperature sensing control arrangement of the invention will now be described. It includes two identical bimetallic strips or arms 3, 4 of dissimilar material. As is known, such strips will bend or flex with a change in temperature. They are conventionally used, for example, in thermostatic controls for heating systems. Strips 3, 4 carry respective opposed cooperable facing electrical contacts 5, 6.

Identical heater coils 7, 8 are respectively wound around the bimetallic strips 3, 4. The heating coils are of course electrically isolated from the bimetallic strips. Heater coil 7 is connected to a voltage source V which may be an A.C. or D.C. source of any desired magnitude, through a manually variable resistor 11. The other heater coil 8 is connected to the voltage source V in series with thermistor T.

In the preferred form of the invention disclosed herein, the thermistor T is of the type having a negative coefficient of resistance. That is to say, as its temperature goes down, its resistance rises, and vice versa.

The bimetallic strips 3, 4 are so arranged, and the respective resistances of variable resistor 11 and thermistor T so selected, that when the latter senses the maximum temperature at which ice will be completely formed in tray, e.g. 10° F., contact 6 will touch contact 5 to complete the circuit for motor M and thereby initiate an ice-ejecting cycle, to be described shortly.

Figure 2:
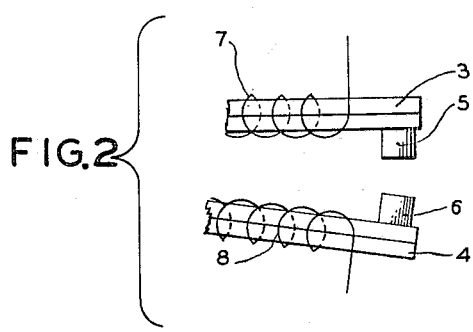
FIG. 2 is an enlarged fragmentary detail view of the cooperating bimetallic strips with their free ends carrying the cooperating electrical contacts spaced when the temperature in the ice cube tray is higher than that at which the ice ejecting cycle is to be initiated.

The higher the temperature of the water in the tray, the lower will be the resistance of thermistor T. This means that more current will be passing through heater coil 8, resulting in a greater degree of bending or flexure of bimetallic strip 4 away from strip 3. Note FIG. 2. As the water temperature drops, the thermistor's resistance rises, causing less heating and therefore less bending of strip 4. When the ice temperature in the tray drops to 10° F., the current in coil 8, as controlled by the thermistor, will have fallen to the point where strip 4 will have unflexed enough to move its contact 6 into abutment with contact 5 of strip 3, as shown in FIG. 1. As is apparent from the drawing, this completes the power circuit for motor M from voltage source V1.

As mentioned earlier, the motor operates to release the cubes from the tray and inverts the tray to discharge the cubes into a hopper. Two cams 12, 13 are driven by the motor. As soon as the motor starts, cam 12 closes a switch 14 to complete a second power circuit for the motor, which will thus complete its cycle even though the rising temperature of thermistor T causes strip 4 to move away from strip 3.

After the tray has been inverted to dump the ice cubes and then returned to upright position, cam 13 operates a switch 15 to close the circuit for solenoid valve 2 to refill the tray with water for the next ice-cube-making cycle.

Any changes in the ambient temperature, as when the refrigerator door is opened, will not affect the accuracy of the system, since the two identical bimetallic arms will move equally in response to the ambient temperature change.

Similarly, there is automatic compensation for any changes in voltage V, since there will be similar current changes in the identical heater coils 7, 8, and therefore equal deflection in the two bimetallic strips.

In this regard, we have conceived that the system can maintain very high temperature sensing accuracy in spite of such voltage fluctuations if the total resistances of the two heater coil circuits are substantially equal at about the temperature (say, 10° F.) at which the ice-ejecting cycle is to be initiated, i.e., contacts 5, 6 are to touch. As the cycle-initiating (contact-closure) ice temperature is closely approached, contact 6 of strip 4 will be very close to contact 5. If voltage V were to change now, and the two heater coil circuits were of different resistances, there would be unequal heating changes of the two bimetallic strips causing a change in the contact spacing. This will result in either premature or delayed contact closure, depending on which circuit has the greater resistance. Incompletely frozen ice will result from premature closure. Delayed closure will of course reduce the rate of ice production.

However, if both heater coil circuits are substantially equal in resistance when the intended contact-closing ice temperature is being reached, any voltage fluctuation will produce precisely identical deflection of the two bimetallic strips whereby the contact spacing will remain as determined solely by the ice temperature sensed by thermistor T.

Typical resistances that can be used are as follows, assuming V to be 30 volts: 11—1000 ohms; T—135 ohms at the incoming water temperature, 1000 ohms at 10° F. The two heater coils 7, 8 being identical are of equal resistance. The remaining leads of the two heater coil circuits have relatively negligible resistance or can be made of precisely equal resistance.

The variable resistor 11 allows the current in heater coil 7 to be set to give a preselected spacing between the strips 3, 4. This, in turn, provides a preset variable control of the temperature at which thermistor T will initiate the ice cube ejection cycle.

For any given specific system of the invention, the thermistor to be used and the amount of current passing through it should be such that the self-heating effect of the thermistor will be negligible.

While there has been shown and described a preferred form of the invention, it will be understood that numerous changes can be made without departing from the principles of the invention or its various features. For example, the thermistor could be of the type having a positive coefficient of resistance, and the arrangement of the bimetallic strips and heater coils suitably modified to still initiate the ice-ejecting cycle at the desired ice temperature. In another variant, the bimetallic strips can be contained in an insulated housing, which could be heated, if desired, to isolate them from changes in ambient temperature. Numerous other variations are possible. Accordingly, it is intended that the foregoing disclosure of a preferred embodiment be illustrated only and not in any way limitative of the following claims.

We claim:
1. In an ice making device having a receptacle in which water is cyclically frozen into ice and ejected therefrom, means operable to cause ejection of said ice from said receptacle, and means for controlling cyclic operation of said device in response to the temperature of said ice, said controlling means comprising:
 first and second temperature responsive movable members;
 electric circuit means for controlling operation of said ejection means, said electric circuit means including cooperable movable electrical contacts each of whose spatial position is controlled by a respective one of said movable members;
 respective first and second heating means for and electrically isolated from said first and second movable members;
 means for sensing the temperature of the ice in said receptacle and effective to control said first heating means to cause said first member to move to cause closure of said first electrical contacts when the ice has reached a given temperature; operation of said ejection means being responsive to closure of each contacts.

2. The combination according to claim 1, wherein said movable members comprise substantially identical bimetallic members.

3. The combination according to claim 2, wherein said heating means comprise substantially identical first and second electrical resistance heating means.

4. The combination according to claim 3, wherein said temperature sensing means comprises an electrical resistance device whose resistance varies with its temperature.

5. The combination according to claim 4, wherein the resistance of said electrical resistance device varies inversely with its temperature.

6. The combination according to claim 4, further comprising a presettably adjustable resistor electrically connected to said second heating means.

7. The combination according to claim 4, further comprising a first electric circuit including said first resistance heating means and said temperature sensing electrical resistance device;
 a second electric circuit including said second resistance heating means;
 the resistance of said first and second circuits being substantially equal at a temperature lower than approximately 32° F.

8. The combination according to claim 7, wherein said second electric circuit includes a manually presettable variable resistor.

9. The combination according to claim 8, wherein the resistance of said variable resistor and of said temperature sensing resistance device are substantially equal at a temperature lower than approximately 32° F.

10. The combination according to claim 9, wherein said temperature sensing resistance device is a thermistor.

11. The combination according to claim 10, wherein said first and second circuits include means for connecting said circuits to a common voltage source.

(References on following page)

References Cited by the Examiner

UNITED STATES PATENTS

| | | | |
|---|---|---|---|
| 2,669,848 | 2/1954 | Minoru Fujii | 62—140 X |
| 2,910,569 | 10/1959 | Boddy | 236—68 |
| 2,996,895 | 8/1961 | Lippincott | 62—139 X |
| 3,039,278 | 6/1962 | Thompson | 62—140 |
| 3,069,524 | 12/1962 | Hanssen. | |

References Cited by the Applicant

UNITED STATES PATENTS

| | | |
|---|---|---|
| 2,329,119 | 9/1943 | Jacobs. |
| 2,394,885 | 2/1946 | Baak. |

ROBERT A. O'LEARY, *Primary Examiner.*

MEYER PERLIN, *Examiner.*

W. E. WAYNER, *Assistant Examiner.*